Aug. 14, 1951      C. G. HOOS      2,564,624
METHOD AND MEANS FOR MAKING LIPSTICKS
Filed July 30, 1948      3 Sheets-Sheet 1
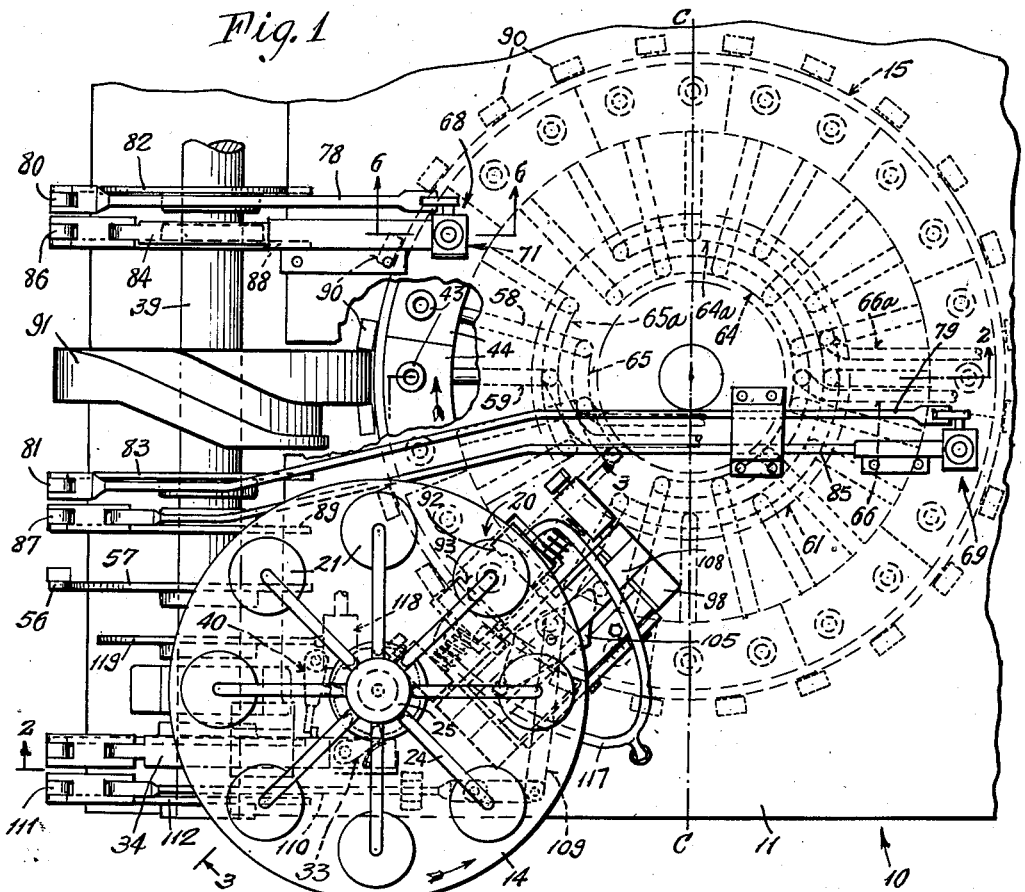
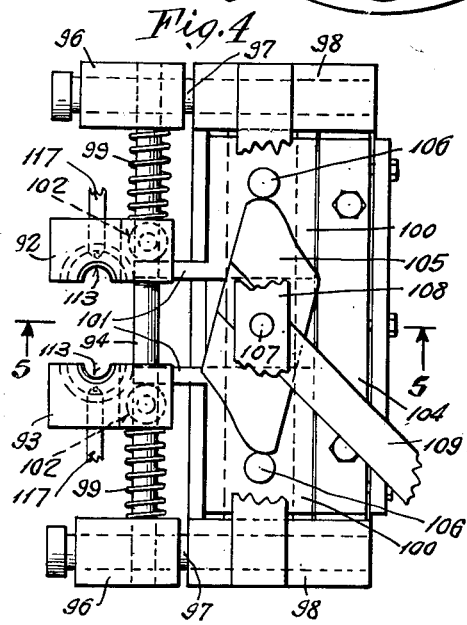
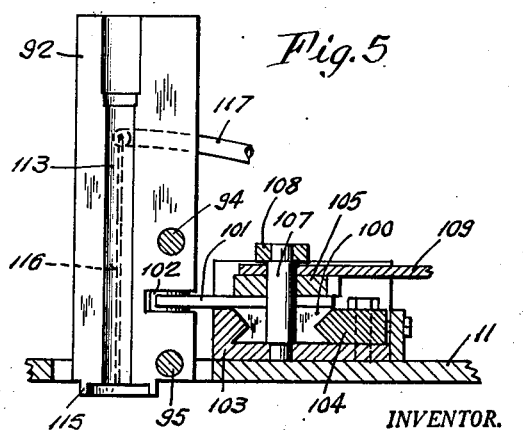
INVENTOR.
Curtis G. Hoos
BY
Johnson and Kline
ATTORNEYS Aug. 14, 1951  C. G. HOOS  2,564,624
METHOD AND MEANS FOR MAKING LIPSTICKS
Filed July 30, 1948  3 Sheets-Sheet 2
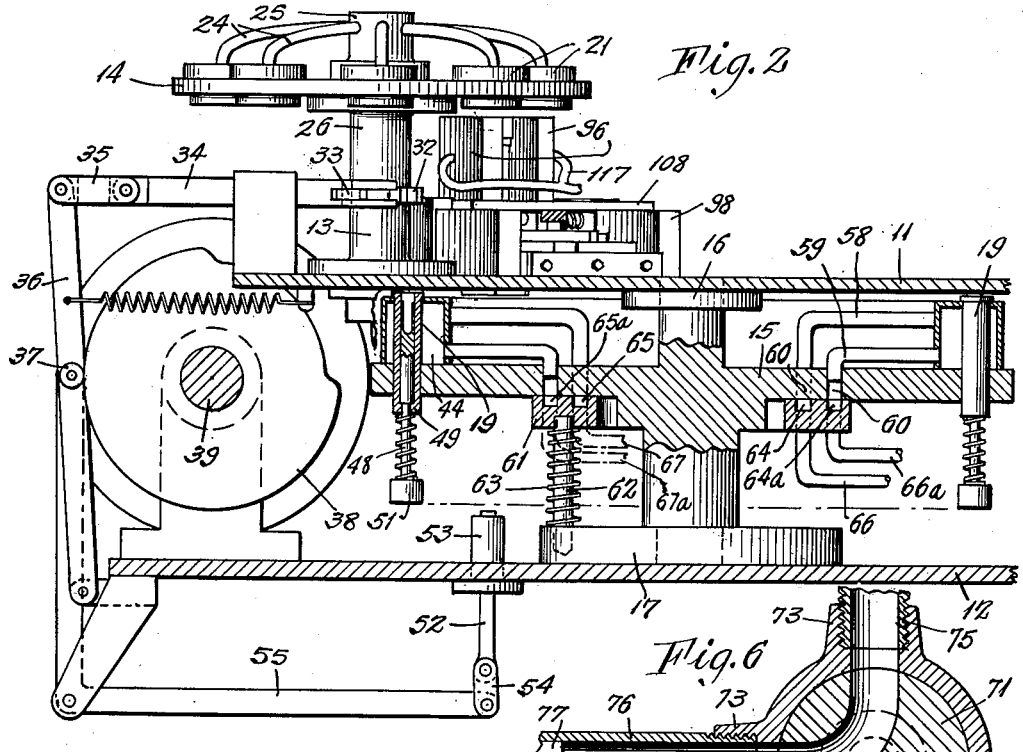
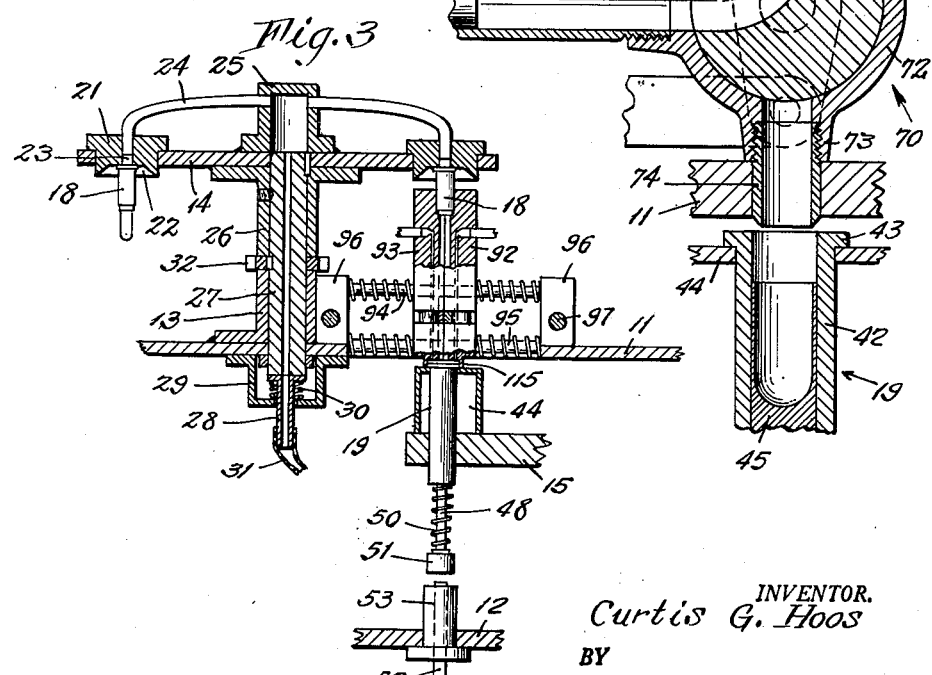
INVENTOR.
Curtis G. Hoos
BY
Johnson and Kline
ATTORNEYS Aug. 14, 1951 C. G. HOOS 2,564,624
METHOD AND MEANS FOR MAKING LIPSTICKS
Filed July 30, 1948 3 Sheets-Sheet 3
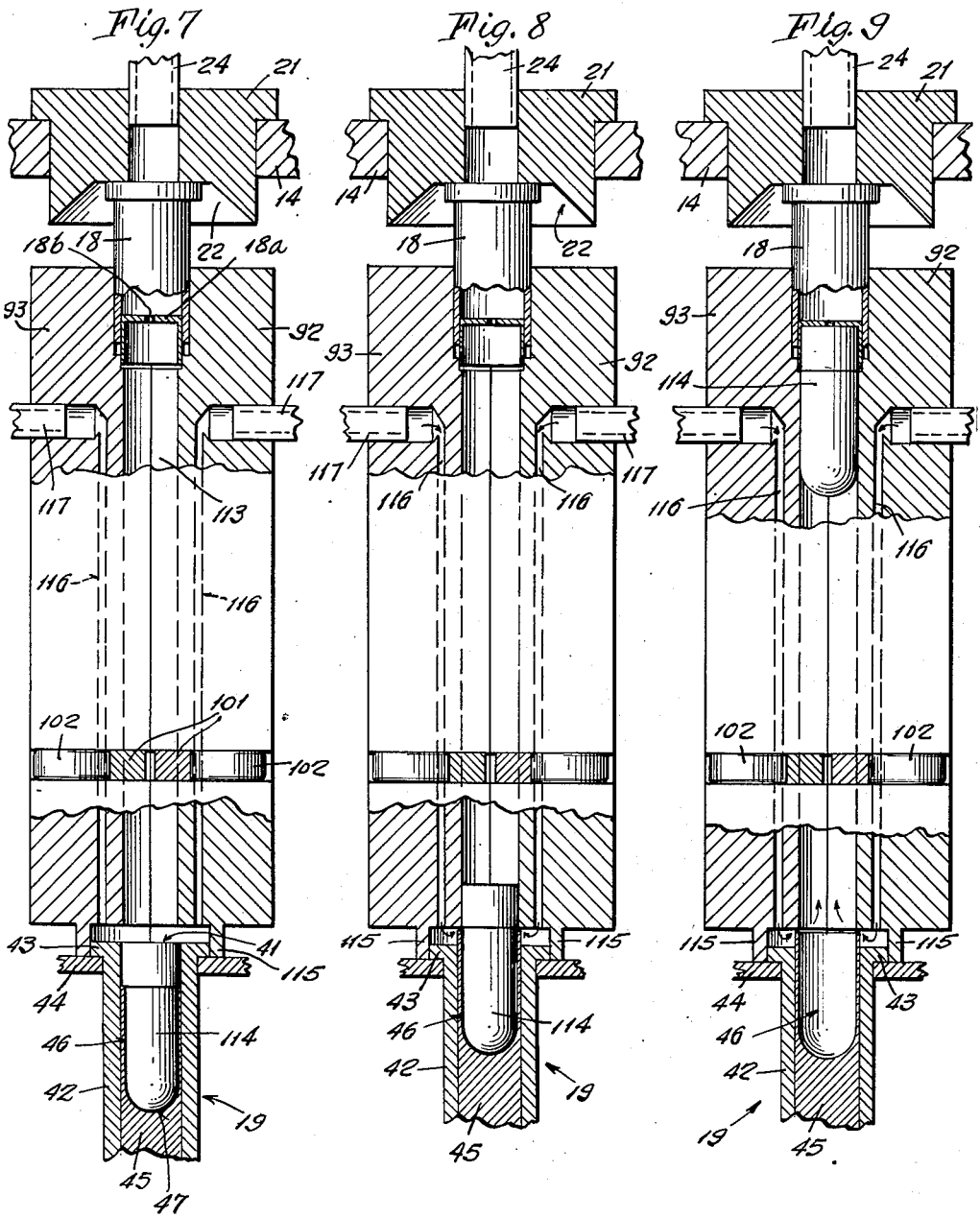
INVENTOR.
Curtis G. Hoos
BY
Johnson and Kline
ATTORNEYS Patented Aug. 14, 1951

2,564,624

UNITED STATES PATENT OFFICE 2,564,624

METHOD AND MEANS FOR MAKING LIPSTICKS

Curtis G. Hoos, Flushing, N. Y., assignor to Warner-Hudnut, Inc., a corporation of Delaware Application July 30, 1948, Serial No. 41,627

23 Claims. (Cl. 18—5)

This invention relates to methods and means for making molded pieces and transferring the pieces to holders or cases therefor.

The invention is herein illustrated as applied to the molding of lipsticks and the transferring of the molded sticks to holders or cases. However it should be understood that the invention has utility in connection with other molded or cast pieces which are to be transferred to holders or casings, and is not to be limited to the specific application disclosed herein as illustrative of the invention.

An object of the invention is to provide an improved method and means for automatically molding lipsticks and automatically transferring the lipsticks without handling to cases whereby a uniform product is obtained at all times, devoid of irregularities, dirt or other foreign matter.

Another object of the invention is to provide an improved method and means as stated above, which is quick in operation and economical to carry out, and which reduces the amount of handling of the lipsticks.

Still another object of the invention is to provide an improved automatic apparatus as characterized above, which is simple and inexpensive in construction and reliable in operation.

A further object of the invention is to provide, in an apparatus of the above type, improved means for plural charging the molds with moldable, viscous lipstick material whereby inadvertent dripping of the material from the discharge means of the supply is eliminated, thereby reducing waste and messiness.

In accomplishing the above objects there is provided in accordance with the invention a novel machine comprising a pair of juxtaposed rotary members or dials having related, intermittent or stepped movements and having a predetermined relationship with each other at a transfer station in the machine.

One of the dials has a plurality of molds, and means are provided for depositing predetermined charges of lipstick material in the molds; the other dial is adapted to function as a carrier for lipstick cases. By their relative positions and stepped movements, the dials bring into cooperable relationship successive charged molds and lipstick cases, and an intermediary positioning and transfer means is provided, associated with the dials for accurately positioning the charged molds and cases at the transfer station, said means comprising part of a novel organization whereby the molded lipstick material which is in the mold is quickly and conveniently transferred to the case without deformation or contamination.

In the transfer of the molded lipstick to the case, fluid under pressure is utilized, and with this arrangement a quick and effective removal of the molded piece from the mold is had without requiring prolonged physical contact with the piece or excessive pressure; thus there is eliminated damage or deformation of the lipstick or contamination thereof with dirt or other foreign matter.

A novel means for effectively and fully charging the molds with the moldable lipstick material without waste is provided, including a plurality of molding stations whereby shrinkage of the material due to cooling is compensated for, and including an improved and simplified mechanism for determining the amount of charge and for eliminating drip at the loading stations by sucking back from the discharge nozzle portions of the succeeding charges, thereby reducing any messiness or depositing of undesired molding material on the mold-carrying dial.

Other features and advantages will hereinafter appear.

In the accompanying drawings:

Figure 1 is a top or plan view of the improved apparatus of the invention.

Fig. 2 is a sectional and elevational view taken on line 2—2 of Fig. 1.

Fig. 3 is a detail in vertical section taken on line 3—3 of Fig. 1.

Fig. 4 is a detail plan view of the intermediary means between the machine dials, for aligning the molds and lipstick cases and for effecting transfer of the molded pieces to the cases, this view also showing part of the operating mechanism for said means.

Fig. 5 is a sectional view taken on line 5—5 of Fig. 4.

Fig. 6 is a fragmentary sectional view taken on line 6—6 of Fig. 1, and

Figs. 7, 8 and 9 are details partly in elevation and partly in vertical section, illustrating the transfer of a molded piece from a mold to a case at the transfer station of the machine, these detail views also showing the construction of the intermediary transfer and aligning means.

Referring to Figs. 1 and 2, the improved machine of this invention for molding lipsticks and transferring the same to cases, comprises a frame 10 having upper and lower horizontal frame plates 11 and 12 respectively, spaced apart from each other and supported in spaced relationship above the floor surface in any suitable manner.

The upper plate 11 has mounted on it an upstanding sleeve bearing 13 by means of which a horizontal dial 14 is rotatably carried. Between the plates 11 and 12 of the machine, a second horizontal dial 15 is rotatably mounted, being carried by upper and lower bearing plates 16 and 17 respectively, secured to the frame plates 11 and 12.

In accordance with the present invention, the upper dial 14 is adapted to carry lipstick cases 18, Figs. 3 and 7 through 9, and the lower dial 15 adapted to carry lipstick molds 19, the dials having stepped rotary movements imparted to them and being so relatively located that cases 18 and molds 19 carried by the peripheral portions thereof may have a cooperable relationship at a station in the machine indicated at 20 in Fig. 1, which I term a "transfer station" since molded lipsticks are at this station transferred from the molds 19 to the cases 18.

For the purpose of conveniently carrying the lipstick cases 18 on the dial 14, and to enable the cases to be readily placed on the dial and removed therefrom, a vacuum holding mechanism is provided, comprising bushings 21 which are provided, disposed at intervals around the dial periphery, the bushings extending through the dial as shown in Fig. 3 and having frustro-conical recesses 22 in their lower faces to receive the closed ends of the cases 18. The bushings 21 have central bores 23 communicating with the recesses 22, the bores 23 being connected with air lines 24 extended radially from a hollow distributor head 25 secured to the center of the dial.

The dial 14 has a hub 26 extending downwardly therefrom and carrying a shaft 27 which passes through and bears in the sleeve bearing 13 mounted on the frame plate 11. The shaft 27 is centrally bored and at its lower end slidably engages under pressure a tubular flanged fitting 28 carried in a housing 29 and maintained in engagement with the shaft by a helical compression spring 30. The tubular fitting 28 is connected with a flexible hose 31 leading to a vacuum apparatus (not shown) whereby air may be evacuated from the air lines 24, distributor head 25 and bore of the shaft 27. By this vacuum holding organization, it is possible for an operator to quickly and conveniently place the lipstick cases 18 on the intermittently rotating dial 14 to be held thereto by the vacuum in the air lines 24 and bushings 21, by merely placing the closed ends of the lipstick cases 18 flat against the flat surfaces in the frustro-conical recesses 22 of the bushings 21. The sloping surfaces of the recesses 22 will automatically act as guides for the lipstick cases 18 during this operation, and the cases will be retained in place by virtue of the atmospheric pressure thereon being greater than the pressure in the air lines 24 and bushing bores 23.

The dial 14 is periodically rotated through parts of a revolution by a ratchet wheel 32 keyed to the shaft 27 and located between the hub 26 and sleeve bearing 13, the wheel 32 being engaged by a spring-urged pawl 33 carried on a horizontal slide bar 34 connected by a link 35 with a lever 36 having a roller or cam follower 37 engaging a cam 38 mounted on a horizontal shaft 39 of the machine, which is the main shaft of the machine and is continually rotating. The dial 14 is locked in each succeding position by a positive detent 40, Fig. 1, actuated by the slide bar 34.

The lower dial 15 of the machine carries the lipstick molds 19 at spaced intervals around its periphery, the molds being generally of tubular form, located in upright position, and having open ends or mouths 41 at their tops. As shown in Figs. 2 and 7 through 9, each mold 19 is formed of sections, including an outer section or sleeve 42 provided with an external flange 43 at its top, engaging the upper wall of a segmental-shaped heating and cooling jacket 44 surrounding the mold. A plurality of jackets 44 is provided, as shown in Fig. 1, extending around the peripheral portion of the dial 15 whereby all of the molds 19 may have both heating and cooling liquid circulated around them by means to be hereinafter described.

Within the outer section or sleeve 42 of each mold, an inner section 45 is slidably carried, having a recess 46 provided with a bottom surface 47. The inner sections 45 of the molds are in the form of plungers, having shanks 48 extending through bottom walls 49 of the mold sections 42 and carrying helical compression springs 50 held in place by enlargements 51 at the lower ends of the shanks 48. The plungers 45 are normally held in lowered or retracted positions as shown in Figs. 2 and 7 by the springs 50, and the plungers may be periodically shifted upward to cause their upper edges to extend slightly above the flanges 43 of the mold sections 42 by a push rod 52 slidably carried by the lower frame plate 12 of the machine in a bushing 53, the said rod being connected by a link 54 with a bell crank 55 having a cam follower 56 actuated by a cam 57 carried by the continually rotating main shaft 39 of the machine.

The push rod 52 is located at the transfer station 20 of the machine, Fig. 1, and therefore the plungers 45 of the molds may be shifted upward when at the transfer station, such shifting comprising part of the transfer operation to be hereinafter described in detail whereby molded lipsticks are transferred from the molds 19 to the lipstick cases 18 carried in the upper dial 14.

Referring to Figs. 1 and 2, the heating and cooling jackets 44 are connected with feed and discharge lines 58 and 59 which terminate in openings 60 through the dial 15, located in concentric circles. A rotary valve 61 is mounted on studs 62 carried by the bearing plate 17 of the machine, and is urged upward against the underside of the dial 15 so as to have sliding frictional engagement therewith by helical compression springs 63 carried by the studs 62. The valve 61 has in its upper face a pair of concentric semi-circular grooves 64, 64a extending through a relatively wide arc, and has another pair of concentric semi-circular grooves 65, 65a extending through a much smaller arc, all the said grooves being adapted to communicate in prearranged order with the openings 60 in the dial 15 whereby the molds 19 may be preheated, prior to receiving the initial charge of lipstick material, and thereafter cooled, after receiving the initial charge. Cooling fluid lines 66 and 66a are secured to the rotary valve 61 to communicate with the grooves 64 and 64a thereof respectively, whereby a cooling liquid may be circulated in the jackets 44 on the dial 15 during approximately three quarters of its travel, see Fig. 1. Also, hot fluid lines 67 and 67a are provided, communicating with the grooves 65 and 65a of the valve 61, to supply hot liquid to the jackets 44 directly after they leave the transfer station 20, during approximately one-quarter revolution of the dial 15.

In accordance with the present invention, the molds 19 are filled with charges of heated moldable plastic lipstick material which shrinks when cooled, and the filling is done in such a manner that each mold is enabled to carry a maximum amount of such material, considering its size, for transference to the lipstick cases 18. In accomplishing this, two loading stations 68 and 69 are provided in the machine whereby each mold may be given a full initial charge of moldable material, then the initial charge cooled (which shrinks the charge), and then the mold given another charge of moldable substance to again fill it and compensate for shrinkage of the first charge.

Referring to Fig. 1, the lower dial 15 is shown by the arrow as having a clockwise rotation (which is intermittent as will be later brought out), and the loading station 68 is shown as being to the left of the center line "C" through the dial, the loading station 69 being to the right of the center line and substantially diametrically opposite the station 68.

Referring to Fig. 6, each loading station has a conduit means 70 provided with relatively movable sections, the conduit means being shown as having the form of a 3-way valve including a valve member 71 rotatable in a valve casing 72, the latter having three internally threaded inlet and outlet connections 73. One of the connections 73 has a nipple 74 which is secured in the upper frame plate 11 of the machine whereby the nipple may discharge into any of the molds 19 on the dial 15 which may be positioned below it. The opposite connection 73 of the valve is connected by a nipple 75 with a source of supply (not shown) of heated viscous moldable lipstick material. The remaining connection 73 of the valve is connected to a pipe 76 acting as a cylinder in which a plunger or piston 77 is slidable.

Referring to Fig. 1, the valve members 71 are actuated by links 78 and 79 connected with levers 80 and 81 respectively, which are in turn periodically actuated by cams 82 and 83 carried on the main shaft 39 of the machine. The pistons 77 are actuated by links 84 and 85 which are connected to levers 86 and 87 also periodically moved by cams 88 and 89 on the main shaft 39 of the machine.

For the purpose of periodically advancing it, the lower dial 15 has a plurality of rollers 90 disposed around its periphery and adapted to act as cam followers for engagement with a driving cam 91 on the main shaft 39, and by this organization, the dial 15 is intermittently driven in a clockwise direction through fractions of a revolution, the intervals of rest of the dial being arranged to cause a pair of molds 19 to be located at the loading stations 68 and 69 whereby charges of lipstick material may be placed in the molds. Also, during the periods of rest of the dial 15, a mold 19 is disposed at the transfer station 20 whereby the molded lipstick therein may be transferred to a lipstick case 18, as will now be brought out in detail.

In accordance with the invention, an improved means is provided for guiding the molded lipstick to be transferred from a mold 19 to a lipstick case 18, and for positively positioning and aligning the mold 19 at the transfer station 20 with the lipstick case 18.

Referring to Figs. 1 through 5, this means is in the form of a floating clamp having a pair of cooperable jaws 92 and 93 consisting of upright blocks slidably carried by a pair of guide bars 94 and 95 secured at their ends in carrier blocks 96 which are slidable on bars 97 mounted in blocks 98 secured to the upper frame plate 11 of the machine. The guide bars 94 and 95 carry helical compression springs 99 whereby the clamping jaws 92 and 93 are normally urged toward and into engagement with each other, and the jaws are adapted to be separated by slides 100 having arms 101 engaging rollers 102 carried by the jaws. The slides 100 are slidable in guide blocks 103 and 104 secured to the upper frame plate 11 of the machine and actuated by a cam 105 engaging studs 106 mounted on the slides. The cam 105 is carried on a shaft 107, one end of which bears in the guide block 103 and the other end of which bears in a bearing bar 108 secured to the blocks 98. The cam 105 is actuated by an arm 109 connected to a link 110 which is in turn connected to a lever 111 periodically actuated by a cam 112 on the main shaft 39 of the machine. Actuation of the cam 105 causes the jaws 92 and 93 to be either spread apart or forced together, the compression springs 99 being also obviously involved in this action.

Referring to Figs. 5 and 7 through 9, the clamping jaws 92 and 93 have vertical semi-circular grooves 113 in their opposed faces, which form a channel when the jaws are together, through which a molded lipstick 114 may pass. The upper portions of the grooves 113 are enlarged to receive and embrace the lipstick cases 18, and the lower portions of the jaws 92 and 93 have depending semi-circular flanges 115 adapted to extend around and engage the external flanges 43 of the molds 19. The jaws 92 and 93 are also provided with air channels 116 extending parallel with the grooves 113 and at their lower ends communicating with the recesses formed by the depending flanges 115. At their upper ends, the air channels 116 are connected with flexible hoses 117 which are brought to a source of compressed air (not shown).

In the organization as provided by the invention, a combination mechanical and pneumatic transfer of molded lipsticks is effected between the molds 19 and the lipstick cases 18 which are consecutively presented and located at the transfer station 20 of the machine, such transfer being effected very quickly and without likelihood of damage or deformation of the molded lipsticks. Also, the likelihood of dirt or other foreign matter being deposited on the molded lipsticks is eliminated by the novel transfer thereof to the cases 18, and therefore, the finished product will be substantially uniform in configuration and devoid of any foreign matter which might detract from its usefulness.

Control of the compressed air which is fed to the clamping jaws 92 and 93 is effected by an air valve 118, Fig. 1 actuated by a cam 119 on the machine shaft 39. The air is automatically fed to the jaws 92 and 93 after the latter have closed against each other, and the air is shut off prior to the jaws being separated.

The operation of the improved machine of the invention is as follows: All of the movable parts of the machine are actuated primarily by the rotation of the main shaft 39 of the machine, through cams carried on the said shaft. Thus, the correct timing of the various parts of the machine may be automatically provided for by proper design and setting of the cams. For each revolution of the main shaft 39, the lower dial 15 is advanced by the cam 91 through a part of a revolution whereby succeeding molds 19 are presented to the loading stations 68 and 69 and also to the transfer station 20, and the dial allowed to rest for an interval with the molds in these positions. Simultaneously with the movement of the lower dial 15, the upper dial 14 is rotated through part of a revolution by the ratchet drive thereof, actuated by the cam 38 on the shaft 39, whereby succeeding lipstick cases 18 are presented to the transfer station 20; the dial 14 also has periods of rest where the cases 18 remain for an interval at the transfer station.

It will be understood that the cases 18 have been placed on the dial 14 by hand, and are retained thereon by the suction in the lines 24 connected with the bushings 21 on the dial.

During the periods of rest of the dials 14 and 15, the loading mechanisms at the stations 68 and 69 are made operative by further rotation of the main shaft 39, and charges of lipstick material are deposited in the molds 19.

Referring to Fig. 6, prior to the depositing of a charge in a mold at either one of the loading stations, heated viscous moldable material from the source of supply is fed to the channel in the valve member 71, through gravity and a retraction of the piston 77, and this may occur during the movements of the dials 14 and 15. Upon the dials becoming stationary, the valve member 71 will be actuated to cause the channel thereof to communicate with the nipple 74, whereupon the piston 77 is advanced or moved to the right, causing the moldable substance to be discharged from the valve member through the nipple 74 and into the mold 19. A predetermined quantity of moldable material is thus placed in the mold 19, whereupon the piston 77 is retracted, causing the remainder of the substance in the nipple 74 to be sucked back into the valve member 71 and cylinder 76. After this occurs, the valve member 71 is again rotated to the position shown in Fig. 6. By this sucking action, an advantageous retraction of the moldable substances from the nipple 74 is had whereby any tendency for said substance to drip on the dial 15 and cause waste or a messy condition is eliminated.

As the dial 15 continues its intermittent advancing movement, the molds 19 which have been charged at the molding station 68, will be cooled by the cooling jackets 44 and the moldable material in the molds will shrink or contract in the process of cooling. When the initially charged molds 19 reach the loading station 69, the shrinkage of the moldable substance therein will have become sufficient so that an additional charge may be inserted in the molds, and this is done at the station 69 in the same manner that the initial charge was deposited at the station 68.

As the dial 15 continues to rotate clockwise, the molds 19 which have been doubly charged, will be presented to the transfer station 20, and at this station, when the dials 14 and 15 have come to rest, the guide and positioning means comprising the clamping jaws 92 and 93 will be made operative and the jaws will be forced together whereupon they will clamp the lipstick case 18 presented at the transfer station and also the flange 43 of the mold 19 presented at the station. Thus, the mold and lipstick case will be brought into accurate alignment and held therein, and any slight irregularities in the position of the mold 19 will be taken care of by the floating construction of the positioning means whereby the jaws 92 and 93 are shiftable on the guide bars 94 and 95, and whereby the guide bars are also movable laterally with the carrier blocks 96 since the latter are slidable on the transverse bars 97 secured to the blocks 98. When the clamping jaws 92 and 93 close on the lipstick case 18, the latter may shift laterally if out of line with the jaws, since the recess 22 in the bushing 21 is formed sufficiently large to provide for a slight amount of lateral shifting of the lipstick case on the flat surface in the recess.

Upon the clamping jaws 92 and 93 coming together, the plunger 45 in the clamped mold 19 is raised to a position shown in Figs. 8 and 9 by actuation of the push rod 52 and bell crank 55 operating the same. This partially ejects the molded lipstick 46 from the mold 19. Compressed air is now fed through the air lines 117 and passes through the air channels 116 in the directions indicated by the arrows in Fig. 8. This compressed air passes around the molded lipstick which has shrunk slightly, as shown, and has separated from the walls of the plunger section 45 of the mold. The pressure of the air on the lipshick will have a raising effect, and will force the lipstick 46 rapidly upward in the manner of a projectile. The lipstick will pass from the channel provided by the grooves 113 in the clamping jaws, and will be forcibly deposited in the lipstick case 18 where it will be retained. In connection with the retention of the lipstick in the case 18, the transverse wall 18a of the case is preferably provided with an aperture 18b, Figs. 7, 8 and 9, which aperture is formed to provide a burr on the underside of the wall. This burr tends to displace the lipstick material in a manner to cause the lipstick to be securely held in the case.

Upon the molded lipstick 46 being transferred to the case 18, the jaws 92 and 93 will be separated by actuation of the cam 105, whereupon the dials 14 and 15 will continue their intermittent rotating movement to present the next-filled mold and the next lipstick case at the transfer station 20. The lipstick case 18 carrying the molded lipstick 46 will be retained on the dial 14 by the suction means provided, and may be removed by an operator at the time that unfilled lipstick cases are applied to the dial.

The inside diameter of the outer mold section 42 is slightly greater than the diameter of the bore or passage provided by the grooves 113 in the jaws 92 and 93, the differences in the diameters being such that shrinkage of the molded lipstick will cause the portion thereof of enlarged diameter to have a close fit in the passage provided by the clamping jaws. This results in the action of the compressed air which transfers the lipstick being more effective.

An alternative sequence of operations of which the machine of this invention is capable, and which has several advantages, is as follows: When the molds 19 arrive at the transfer station 20 the plungers 45 of the molds are advanced first, and then the clamping jaws 92 and 93 are brought together. After this, the air pressure is applied through the air passages 116 in the clamping jaws, causing a transfer of the lipstick from the mold 19 to the case 18. This alternative procedure has several advantages. First, it prevents lipstick material from being shaved off the molded stick by the lower edge portions of the clamping jaws; these shavings would constitute waste material, and in accumulating might ultimately result in deformation of the lipsticks. Second, there is no retarding action to the advance of the plunger 45 as might result if the plunger advanced after the jaws were brought together. Such retarding action might cause the lipstick to be firmly seated in the plunger, making it difficult for the compressed air to pass around the lipstick and eject it from the mold.

After the jaws 92 and 93 have been brought together, the plunger 49 may be retracted slightly, providing a greater clearance between the molded lipstick and the bottom of the plunger recess, since the lipstick would be retained by the clamping jaws. This would further facilitate the action of the compressed air.

These variations in the sequence of operations of the plunger and clamping jaws may be readily accomplished by suitably modifying the cam on the main shaft 39 of the machine, as will be readily understood by one skilled in the art.

According to the improved organization provided by the invention whereby ejection and transfer of molded lipsticks to the cases is effected mostly by a pneumatic action, the likelihood of the molded lipsticks being deformed or contaminated with dirt or foreign matter is eliminated, and therefore a more uniform product is obtainable. The initial ejection of the molded lipstick from the molds by actuation of the plunger sections of the molds is not sufficient to deform the lipsticks, as might occur if the lipsticks were completely transferred to the cases by plungers and at the termination of such transfer were positioned by abutments in the cases.

Variations and modifications may be made within the scope of this invention and portions of the improvements may be used without others.

I claim:

1. The method of forming a molded piece and transferring the piece to a holder, which includes the steps of placing a predetermined moldable charge in a mold, moving a holder to a position adjacent the mold to receive the molded piece therefrom, forcing a member against the molded piece to partially eject the latter from the mold, and thereafter forcing a fluid against the molded piece to completely eject it from the mold and simultaneously deposit it in the holder.

2. The method of forming a molded piece and transferring the piece to a holder, which includes the steps of placing a predetermined moldable charge in a mold, moving a holder to a position adjacent the mold to receive the molded piece therefrom, forcing a member against the molded piece to partially eject the latter from the mold, and thereafter forcing fluid against the molded piece and guiding the piece in a manner to completely eject it from the mold and simultaneously deposit it in the holder.

3. The method of forming a molded piece and transferring the piece to a holder, which includes the steps of placing a predetermined moldable charge in a mold, cooling the mold and charge contained therein, moving a holder to a position adjacent the mold to receive molded piece therefrom, forcing a member against the molded piece to eject the latter from the mold, and thereafter forcing fluid against the molded piece in a manner to completely eject it from the mold and simultaneously deposit it in the holder.

4. The method of forming a molded piece and transferring the piece to a holder, which includes the steps of placing a predetermined moldable charge in a mold, moving a holder to a position adjacent the mold to receive the molded piece therefrom, and thereafter forcing fluid against the molded piece and guiding the piece in a manner to completely eject it from the mold and simultaneously deposit it in the holder.

5. The method of forming a molded piece and transferring the molded piece to a case, which method comprises introducing a moldable charge into a mold having a portion of greater cross sectional area at one end thereof thus producing a molded piece having an enlarged portion at one end thereof, positioning said mold containing said molded piece adjacent a case for said molded piece and applying a fluid under pressure to engage said enlarged portion to eject said molded piece from said mold into said case.

6. The method of forming a molded lipstick and transferring this lipstick to a case, which method comprises introducing a moldable charge of lipstick material into a mold having a portion of greater cross sectional area at one end thereof, cooling said mold to produce a lipstick having an enlarged portion at one end thereof, positioning said mold containing said lipstick adjacent a case for the lipstick, and applying a fluid under pressure to the enlarged portion of the lipstick to eject the lipstick from the mold into the case.

7. In a machine for making and mounting lipsticks, a lipstick mold; a carrier for a lipstick case; means for relatively moving said mold and carrier to bring said case and mold into and out of an aligned transfer position, and means to apply fluid directly and uniformly upon a molded portion of the lipstick when the mold and case are in an aligned transfer position, said fluid being under a sufficient pressure to eject the molded lipstick from the mold and deposit it in said case.

8. In a machine for molding an article and mounting the same in a case adapted to receive the article, a mold in which said article is produced, a carrier for said case, means for relatively moving said mold and carrier to bring said mold and case into and out of an aligned transfer position, and means to apply fluid directly and uniformly upon a molded portion of the article when the mold and case are in said aligned transfer position, said fluid being under a sufficient pressure to eject the molded article from the mold and deposit it in said case.

9. In a machine for molding articles and mounting the same in cases adapted to receive the articles, molds in which said articles are produced, a carrier for said cases, means for moving said molds and carrier to bring a mold and one of said cases into and out of a transfer position in which an individual mold and case are spaced from each other, guide jaws movable towards and away from each other and also movable in a direction transverse to the first-mentioned direction of movement, means for closing said jaws to produce a confined linear guide channel bridging said space between and connecting a case and individual mold when disposed in said transfer position, and fluid pressure means for ejecting said molded article from said mold and moving it through said confined channel into said case when each individual mold and case are in said transfer position.

10. In a machine for molding articles and mounting the same in cases adapted to receive the articles, molds in which said articles are produced, each of said molds having a portion of greater cross sectional area at one end thereof to form an article having an enlarged portion at one end thereof, a carrier for said cases, means for moving said molds and carrier to sequentially bring a mold and one of said cases into and out of an aligned transfer position in which said mold and case are spaced from each other, a movable guide constructed and arranged to be moved into position to bridge said space between a mold and one of said cases when they are brought into said aligned transfer position, and means for applying fluid under pressure to the enlarged portion of each molded piece when each mold is brought into said transfer position to eject said piece from said mold and force it through said confined path into a case.

11. In a machine for molding lipsticks and mounting the same in cases, molds in which said lipsticks are formed, each of said molds having a portion of greater cross sectional area at one end thereof to form a lipstick having an enlarged portion at one end thereof, a carrier for said cases, means for moving said molds and carrier to sequentially bring a mold and one of said cases into and out of an aligned transfer position in which the mold and case are spaced from each other, guide jaws movable towards and away from each other and also movable in a direction transverse to the first-mentioned direction of movement, means for closing said jaws to produce a confined linear guide channel bridging said space between and connecting a case and mold when disposed at said transfer position, and means for applying fluid under pressure to the enlarged portion of said lipstick when a mold is brought into said transfer position to eject the lipstick from said mold and force it through said guide channel into a case.

12. In a machine for making and mounting lipsticks, a lipstick mold; a carrier for a lipstick case; means for relatively moving said mold and carrier to bring said case and mold into and out of an aligned transfer position, and means to apply fluid directly and uniformly upon a molded portion of the lipstick facing opposite the case when the mold and case are in said aligned transfer position, said fluid being under a sufficient pressure to eject the molded lipstick from the mold and deposit it in said case.

13. In a machine for molding articles and mounting the same in cases adapted to receive the articles, a mold in which said articles are produced, a carrier for said cases, means for relatively moving said mold and carrier to bring said mold and one of said cases into and out of an aligned transfer position in which the mold and case are spaced from each other, guide means bridging the space between said mold and case, and means to apply fluid directly and uniformly upon a molded portion of the article facing opposite the case when the mold, guide means and case are in said aligned transfer position, said fluid being under a sufficient pressure to eject the molded article from the mold, force it through the guide means and deposit it in said case.

14. In a machine for making and mounting lipsticks, a plurality of lipstick molds; a first dial mounting said molds, a second dial having means for carrying a plurality of lipstick cases located in cooperable relation to the first dial; means for periodically and substantially simultaneously advancing said dials to bring a mold and a lipstick case into and out of an aligned transfer station in the machine in which the mold and case are spaced from each other; means at said transfer station defining a confined passageway bridging said space from said mold to said case; means charging the molds with moldable lipstick material prior to arrival at said transfer station; and means to apply fluid directly and uniformly upon a molded portion of the lipstick facing opposite the case when a charged mold and case are at said transfer station, said fluid being under a sufficient pressure to eject the molded lipstick from the mold, force it through the passageway and deposit it in said case.

15. In a machine for making and mounting lipsticks, a lipstick mold, a carrier for a lipstick case, means causing periodic relative movement between said mold and carrier bringing the same into and out of cooperable position; means locking the mold and a lipstick case in said carrier in alignment when the mold and carrier are in said cooperable positions, said means including a passageway between the case and the mold; and means to apply fluid directly and uniformly upon a molded portion of the lipstick facing opposite the case when a charged mold and a case are in alignment, said fluid being under a sufficient pressure to eject the molded lipstick from the mold, force it through the passageway and deposit it in said case.

16. A machine as defined in claim 14 in which the confined passageway comprises a pair of jaws movable toward and away from each other and also movable in a direction transverse to the first mentioned direction of movement.

17. In a machine for making and mounting lipsticks, a lipstick mold; a carrier for a lipstick case; means causing periodic relative movement between said mold and carrier, bringing the same into and out of predetermined relative cooperable positions; means charging the mold with moldable lipstick material subject to shrinkage in cooling, said charging occurring prior to the mold and carrier attaining said cooperable positions; means cooling the mold and charge carried therein whereby the charge separates from the mold walls; and means transferring a molded lipstick from the mold to a case in said carrier when the mold and carrier are in said cooperable position, including means for introducing fluid between the lipstick and mold walls to engage said molded lipstick under pressure.

18. In a machine for making and mounting lipsticks, a lipstick mold; a carrier for a lipstick case; means causing periodic relative movement between said mold and carrier, bringing the same into and out of predetermined relative cooperable positions; and means transferring a molded lipstick from the mold to a case in said carrier when the mold and carrier are in said cooperable positions, said means including a plunger for partially ejecting the lipstick from the mold, and including means for applying fluid to said molded lipstick under pressure to completely eject the lipstick from the mold.

19. A machine as defined in claim 15 in which the passageway between the case and the mold comprises a pair of jaws movable toward and away from each other and also movable in a direction transverse to the first mentioned direction of movement.

20. In a machine for making and mounting lipsticks, a plurality of lipstick molds; a first dial, mounting said molds; a second dial having means for carrying a plurality of lipstick cases, located in cooperable relation to the first dial; means causing periodic substantially simultaneous advancing movements of the dials, for sequentially bringing the molds and lipstick case carrying means into and out of predetermined relative cooperable positions at a transfer station in the machine; means charging the molds with moldable lipstick material prior to arrival at said transfer station; means locking in alignment the molds at said transfer station; means locking in alignment a mold and a lipstick case carried by the carrying means at said transfer station, said locking means including a passage between said mold and lipstick case at said transfer station; means for transferring a molded lipstick from said mold to said lipstick case at said transfer station, said transferring means including a plunger for partially ejecting a lipstick from a mold and further means for applying fluid under pressure to the partially ejected molded lipstick to complete the ejection of said molded lipstick from the mold and move it through said passage into said case.

21. In a machine for making and mounting lipsticks, a lipstick mold; a carrier for a lipstick case; means causing periodic relative movement between said mold and carrier, bringing the same into and out of predetermined relative cooperable positions; movable mutually engageable jaws engageable with the mold and with a lipstick case on said carrier to align the same when the mold and carrier are in said positions, said jaws having cooperable grooves providing a channel extending between the mold and aligned case for passage of a molded lipstick, and having recesses adjacent the mold providing a chamber, and said jaws also having fluid passages communicating with the recesses thereof; and means supplying fluid under pressure to the said fluid passages and chamber when the jaws are in engagement, said fluid moving a molded lipstick from the mold to the case aligned therewith, through the said channel.

22. In a machine for making and mounting lipsticks, a lipstick mold; a carrier for a lipstick case; means causing periodic relative movement between said mold and carrier, bringing the same into and out of predetermined relative cooperable positions; means moving a molded lipstick from the mold to a case in said carrier when the mold and carrier are in said cooperable positions, said means including (1) a movable mold section advanceable to partially move the lipstick, (2) means for applying fluid under pressure to said partially moved lipstick to complete said movement, and (3) jaws engaging the mold and case to align the same, said jaws providing a guiding passage between the mold and case for the lipstick and being floatably mounted to enable them to conform to the position of the mold; and means for sequentially actuating the movable mold section and jaws whereby the jaws are first brought together, then the movable section of the mold advanced, the lipstick transferred to the case and thereafter the jaws separated.

23. In a machine for making and mounting lipsticks, a lipstick mold; a carrier for a lipstick case; means causing periodic relative movement between said mold and carrier, bringing the same into and out of predetermined relative cooperable positions; means moving a molded lipstick from the mold to a case in said carrier when the mold and carrier are in said cooperable positions, said means including (1) a movable mold section advanceable to partially move the lipstick, (2) means for applying fluid under pressure to said partially moved lipstick to complete said movement, and (3) jaws engaging the mold and case to align the same, said jaws providing a guiding passage between the mold and case for the lipstick and being floatably mounted to enable them to conform to the position of the mold; and means for sequentially actuating the movable mold section and jaws whereby the mold section is first advanced, then the jaws brought together, the lipstick transferred to the case, and thereafter the jaws separated.

CURTIS G. HOOS.

REFERENCES CITED

The following references are of record in the file of this patent:

UNITED STATES PATENTS

| Number | Name | Date |
|---|---|---|
| 724,768 | Wright | Apr. 7, 1903 |
| 1,394,582 | Schilling | Oct. 25, 1921 |
| 1,401,150 | Geyer | Dec. 27, 1921 |
| 1,567,007 | Raiche | Dec. 22, 1925 |
| 1,573,346 | Kissam | Feb. 16, 1926 |
| 1,675,382 | Reinhardt | July 3, 1928 |
| 1,729,843 | Reich | Oct. 1, 1929 |
| 1,852,463 | Kjellgren | Apr. 5, 1932 |
| 2,069,897 | Nagy | Feb. 9, 1937 |
| 2,136,422 | Fields | Nov. 15, 1938 |
| 2,136,424 | Fields et al. | Nov. 15, 1938 |
| 2,138,923 | Johnson | Dec. 6, 1938 |
| 2,263,302 | Johnson | Nov. 18, 1941 |
| 2,498,100 | Tyrrell | Feb. 21, 1950 |